Patented Oct. 25, 1932

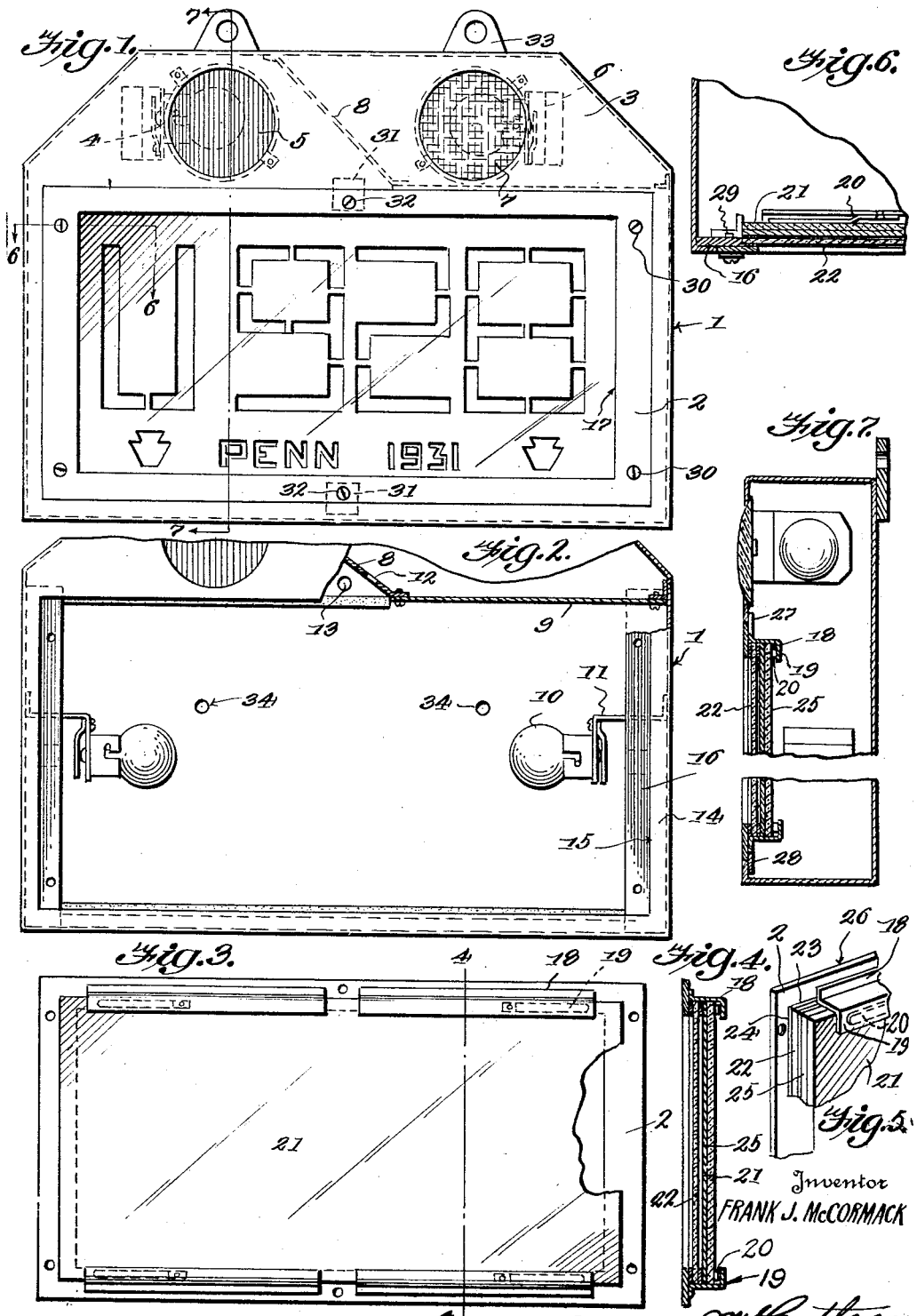

1,884,049

UNITED STATES PATENT OFFICE

FRANK J. McCORMACK, OF LANSDALE, PENNSYLVANIA

ILLUMINATED LICENSE TAG AND HOLDER

Application filed July 14, 1931. Serial No. 550,768.

This invention relates to an illuminated license tag and holder, and has for its object the production of a simple and efficient means for supporting the illuminated tag upon the holder in order to properly display the number of the tag to an approaching vehicle, one tag holder being adapted to be supported upon the front and a second holder being adapted to be supported upon the rear of the vehicle.

Another object of this invention is the production of a simple and efficient casing structure mounted for conveniently and efficiently supporting the license tag for illumination wherein the tag holding frame will be efficiently supported in the carrying casing so as to support the illuminated tag flush with the outer face of the casing.

A still further object of this invention is the production of a simple and efficient illuminated license tag and holder which may be conveniently supported upon a vehicle, one holder being adapted to be supported on each end of the vehicle as is required by the law in many States.

With these and other objects in view, this invention consists in certain novel constructions, combinations and arrangements of parts as will be hereinafter fully described and claimed.

Figure 1 is a front elevation of the illuminated license tag and holder;

Figure 2 is a front elevation of the holder for the tag, a portion of the holder being broken away and shown in section;

Figure 3 is a rear elevation of the license plate holding frame;

Figure 4 is a section taken on line 4—4 of Figure 3;

Figure 5 is a detail perspective view of one end or corner of the license plate holding frame, showing the license plate and the respective glass plate associated therewith;

Figure 6 is a horizontal section taken on line 6—6 of Figure 1;

Figure 7 is a section taken on line 7—7 of Figure 1.

By referring to the drawing it will be seen that 1 designates the casing which is adapted to support the illuminated tag or tag supporting frame 2 which is mounted upon the casing 1. This casing 1 is provided preferably with an upper lamp supporting housing 3, within which is mounted the rear or tail light 4, having a red or other suitable prism 5 to constitute a rear or tail light. A suitable light 6 is also mounted at the opposite end of the lamp housing 3 and over this light 6 is placed preferably an amber prism 7 to constitute a stop light. An angularly extending partition 8 is mounted within the housing 3, as clearly shown in Figures 1 and 2 and is adapted to divide the housing 3 into two compartments to shield the casing 1 from the stop light illumination caused by the lamp 6. The bottom of the housing 3 is also closed by means of a suitable partition 9 to seal the casing 1 against the illumination caused by the stop light 6. Suitable bulbs 10 are mounted in the respective ends of the casing 1, as shown in the drawing, and these bulbs 10 are supported upon suitable brackets 11. The casing 1, or in fact the interior thereof, is therefore illuminated both by the bulbs or lights 10, as well as the light 4, previously described. The partition 8 is provided with a suitable aperture 12 to which a cable may be extended to connect to the light 6, and the cable passing through this aperture 12 may also extend through the aperture 13.

The casing 1 is provided around the side edge thereof with an inwardly turned flange 14, which flange 14 extends around the aperture 15 formed in the casing 1, into which aperture 15 is adapted to snugly fit the license plate carrying frame 2, previously mentioned.

A plurality of end supporting strips 16 are secured to the inner face of the end flanges 14, as shown in Figure 6, and these supporting strips 16 project inwardly with respect to the central aperture 15 and beyond the flanges 14 as shown in the drawing. These supporting strips or plates 16 are adapted to constitute a rest for receiving the license plate carrying frame 2, as shown clearly in Figure 6.

The license plate carrying frame 2 comprises a rectangular body having a central opening 17, and this rectangular body 2 carries a plurality of longitudinally extending runners 18 which are provided with overhanging flanges 19 for the purpose of retaining the license plate and adjoining flange plates hereinafter described. Suitable flat springs 20 are employed and carried by the runners 18 and these springs are adapted to firmly engage the opal glass plate 21 and firmly hold the license plate and front transparent or clear plate 22 in nested and snug relation. A gasket 23 is interposed between the inner face of the frame 2 and the front face of the clear glass plate 22, and a suitable gasket 24 is also interposed between this clear glass plate 22 and the license tag 25. The runners 18 terminate short of the side edges 26 of the frame 2, and a suitable felt sealing strip 27 is adapted to overhang the joint between the casing 1 and the upper edge of the license plate carrying frame 22. A similar sealing strip 28 is arranged along the bottom edge as shown in Figure 7.

Secured to the rear face of the end strip or plate 16 is a stop member 29 against which the ends of the respective plates 21, 22, and 25 abut, thereby firmly holding these plates against longitudinal shifting movement within the casing 1. Suitable screws 30 pass through the frame 2 for securing the frame to the side plate members 16, and secure the frame 2 within the casing 1. Suitable bracket plates 31, shown in dotted lines in Figure 1, may be secured to the inner face of the casing 1 and overhang a portion of the inner face of the frame 2 for receiving suitable screws 32 for the purpose of connecting the frame 2 intermediate its ends to the casing 1 through the medium of the brakets 31.

In carrying out the present invention, for the purpose of displaying an illuminated license tag, I first provide an opal plate 21 which is placed in the rear and then apply or place thereon the stenciled license tag 25, which stenciled license tag is intended to be furnished by the State. An outer clear glass plate 22 is then placed over the license tag 25, the suitable gaskets or washers 22 and 23 being interposed between the frame 2 and the clear plate 22, and the clear plate 22 and license tag 25, as previously described. In carrying out the invention, it is my purpose to furnish the casing and carrying frame, as described, as well as the two plates 21 and 22, and have the State or municipality furnish the stenciled tag plate 25, as is the custom at this time. Each automobile user may then substitute the proper tag at the expiration of each year, and any suitable or desired colors other than white may be used, the numbers preferably being stenciled upon the license plate and a rear milky-white opal plate being used cause the numbers to stand out when the tag casing is illuminated to permit the numbers to be readily observed. It should be understood that the tag plate 25 may be provided with any suitable or desired system of numbering, and that the name of the State may also be stenciled thereon. The tag plate 25 also should be so constructed as to display the proper color background upon the tag whether illuminated or not.

The casing 1 may be provided with suitable hanger members 33 which may be perforated for the purpose of facilitating the attachment of the casing to the automobile in any desired or convenient position, or suitable apertures 34 may be placed in the rear face of the casing 1 to permit the attachment of the casing to a suitable support.

It is desired to point out that the present device may be used both upon the front and rear ends of the automobile and may be illuminated through the source of electric supply. When placing the casing upon the front of the automobile, the stop light lens 5 is replaced by a clear lens or prism and the lens 7 is also replaced by a clear lens and thereby will display a pair of clear lights which may act as parking lights. In carrying out the present invention it is the purpose to employ one casing upon each end of the automobile for the purpose of displaying an illuminated tag at each end of the vehicle in order that the numbers of the vehicle may be observed both by an approaching vehicle as well as a vehicle following.

It should be further understood that certain detail changes in the mechanical construction may be employed without departing from the spirit of the invention so long as the changes fall within the scope of the appended claims.

It should be further understood that a very simple and efficient means has been produced for supporting the licence plate through the medium of the frame structure described, which frame structure is adapted to extend flush across the front of the casing so as to permit the numbers to be viewed, not only from a direct front view but also easily and readily viewed at an angle.

It should be understood that the manufacture of the tags will be greatly simplified and the governmental agency supplying the tags will be enabled to produce the tags at a minimum cost due to the fact that only a flat sheet may be provided having the numbers stenciled or cut out, which sheet may then be merely dipped to be provided the desired color. Only one color may then be used for the body of the tag since the tag wil then display clear white numerals resulting from the cut out or stenciled numerals formed in the tag plate.

Having described the invention, what is claimed as new is:

1. An illuminated license tag and holder comprising a casing, a tag holding frame provided with tag supporting runners extending longitudinally thereof, an opal plate, a stenciled tag and a clear transparent cover plate mounted upon said tag supporting runners, means carried by said casing for supporting said tag supporting frame flush with the outer face of said casing, and abutment means engaging the ends of said plates for holding said frame against longitudinal movement within said casing.

2. A casing of the class described comprising a body having a license plate display opening formed therein, a plurality of supporting plates extending across the ends of said opening and secured to said body, a removable license plate supporting frame seated upon said plates and secured thereto flush with the outer face of said body, and sealing strips secured to said body and overlapping the joints between the license plate supporting frame and the edge of said body.

3. A license plate supporting casing of the class described comprising a body having an enlarged display opening formed therein, said body provided with an inwardly extending flange around the edge of said opening, supporting plates extending across the ends of said opening and below the outer face thereof, a license plate supporting frame seated upon said plates and extending flush with the outer face of said casing, runners supported upon the inner face of said frame and having overhanging flanges, a plurality of plates, one being translucent and the other transparent, a central license plate interposed between said mentioned plates and having their edges nested in said runners, and means carried by said casing for engaging the ends of said plate and holding the same against longitudinal movement within said casing.

In testimony whereof I affix my signature.

FRANK J. McCORMACK.